United States Patent [19]

Wild et al.

[11] Patent Number: 6,120,561
[45] Date of Patent: *Sep. 19, 2000

[54] PROCESS FOR THE PREPARATION OF LOW-SALT, LIQUID DYESTUFF PREPARATIONS

[75] Inventors: Peter Wild, Odenthal; Volker Paulat, Marne; Wolfgang Frank, Köln, all of Germany; Shaun Murphree, Sommerville, S.C.

[73] Assignee: Bayer Aktiengesellschaft, Leverkusen, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 08/842,781

[22] Filed: Apr. 17, 1997

[30] Foreign Application Priority Data

Apr. 18, 1996 [DE] Germany .............. 196 15 260

[51] Int. Cl.⁷ .............. C09B 33/28; C09B 67/26
[52] U.S. Cl. .............. 8/527; 8/662; 8/681; 8/687; 8/696; 8/919; 534/807
[58] Field of Search ............... 8/696, 662, 681, 8/687, 919, 918–924, 527; 534/583, 8 DT

[56] References Cited

U.S. PATENT DOCUMENTS

| | | |
|---|---|---|
| 1,509,442 | 9/1924 | Penny . |
| 2,746,955 | 5/1956 | Armento . |
| 3,600,376 | 8/1971 | Franklin .............. 534/582 |
| 4,149,851 | 4/1979 | Frei et al. . |
| 4,348,204 | 9/1982 | Bauer et al. . |
| 4,500,321 | 2/1985 | Hugelshofer et al. .............. 8/527 |
| 4,808,192 | 2/1989 | Narita et al. . |
| 4,838,895 | 6/1989 | Galli et al. .............. 8/527 |

FOREIGN PATENT DOCUMENTS

| | | | |
|---|---|---|---|
| 2103757 | 8/1971 | Germany .............. | C09B 33/16 |
| 3002062 | 7/1981 | Germany . | |
| 60-15462 | 1/1985 | Japan . | |
| 60015462 | 1/1985 | Japan . | |
| 1331142 | 9/1973 | United Kingdom . | |
| 1359898 | 7/1974 | United Kingdom .............. | D06P 5/00 |
| 1331142 | 9/1993 | United Kingdom .............. | C09B 33/04 |

OTHER PUBLICATIONS

Registry record RN2610–10–8 from Chemical Abstracts Service 1998.
Abstract of JP 56104969 (Aug. 21, 1981).
Houben–Weyl: Methoden der anorganischen Chemie [Methods of Inorganic Chemistry], vol. X/3, year 1965, edition 4, pp. 7–112.
Volume Elba, part 2, year 1990, edition 4, pp. 1060–1068.

*Primary Examiner*—Margaret Einsmann
*Attorney, Agent, or Firm*—Norris, McLaughlin & Marcus, P.A.

[57] ABSTRACT

Process for the preparation of low-salt liquid dyestuff preparations, characterized in that they are obtained by:
 a) diazotization of an aromatic amine,
 b) 2-fold coupling of the diazo component obtained according to a) to I-acid-urea, in the presence of an inorganic base and in the absence of an organic base,
 c) desalination and, if appropriate, concentration by means of a pressure permeation of the reaction mixture obtained according to b), so that an inorganic salt content of less than 1% by weight is achieved.

1 Claim, No Drawings

PROCESS FOR THE PREPARATION OF LOW-SALT, LIQUID DYESTUFF PREPARATIONS

The invention relates to a process for the preparation of low-salt, liquid dyestuff preparations of dyestuffs based on I-acid-urea, and to the use of liquid dyestuff preparations prepared in this way for dyeing and printing substrates containing hydroxyl and/or amide groups, in particular paper.

It is already known from DE-A-30 02 062 that dyestuffs based on I acid-urea can be used for dyeing paper. However, only those dyestuffs which are prepared by the route of simultaneous coupling (diazotizing coupling) or those on which azo coupling is carried out in the presence of diethanolamine are employed in the form of their liquid dyestuff preparations. The dyestuffs prepared in this way, however, are obtained in a low yield (Example 2, 83% of theory; Example 3, 93% of theory). Furthermore, they have a low storage stability in the form of their liquid preparations (cf. Example 3). The dyestuffs thus prepared moreover contain substantial amounts of by-products, which remain in the preparation and impair the quality of the dyestuff in respect of its brilliance. In contrast, dyestuffs based on I-acid-urea which are prepared by another route are used exclusively in the form of their solid preparations (see Example 1).

The dyestuffs based on I-acid-urea which are known from DE-A-21 03 756 are likewise employed for dyeing paper both in the form of their solid preparations and in the form of their liquid preparations. The dyestuff preparations comprise salts which can be dissociated in water, the liquid dyestuff preparations additionally comprising 0.5 to 5 parts by weight of an acid amide, preferably urea, per part of dyestuff.

The liquid dyestuff preparations of dyestuffs with I-acid-urea as the coupling component which are known from DE-A 29 02 034 are always prepared from the solid dyestuff preparations, have a pH of greater than 12 and comprise hydrotropic agents.

Such dyestuffs are also known from U.S. Pat. No. 1,509,442, but are employed for dyeing exclusively in the form of their salt-containing solid preparation.

A process has now been found for the preparation of low-salt storage-stable liquid dyestuff preparations, which is characterized in that the dyestuff preparation is obtained by:
 a) diazotization of an aromatic amine,
 b) 2-fold coupling of the diazo component obtained according to a) to I-acid-urea, in the presence of an inorganic base and in the absence of an organic base,
 c) desalination and, if appropriate, concentration by means of a pressure permeation of the reaction mixture obtained according to b), so that an inorganic salt content of less than 1% by weight, based on the liquid dyestuff preparation, is achieved.

Particularly preferred aromatic amines which are used for the diazotization of the process according to the invention are those containing sulpho groups or carboxyl groups. In particular, these are aminobenzenes containing sulpho groups or aminonaphthalenes, which are optionally further substituted. Preferably, these amines carry 1 to 4, preferably 1 or 2, $SO_3H$ groups. Examples of further substituents which may be mentioned are $C_1$–$C_4$-alkyl, in particular methyl, ethyl and n-propyl, $C_1$–$C_4$-alkoxy, such as methoxy, ethoxy or propoxy, halogen, such as Cl or fluorine, optionally substituted azobenzene or substituted or unsubstituted amino groups.

Particularly preferred aromatic amines which may be mentioned are those of the following formulae (1)–(6).

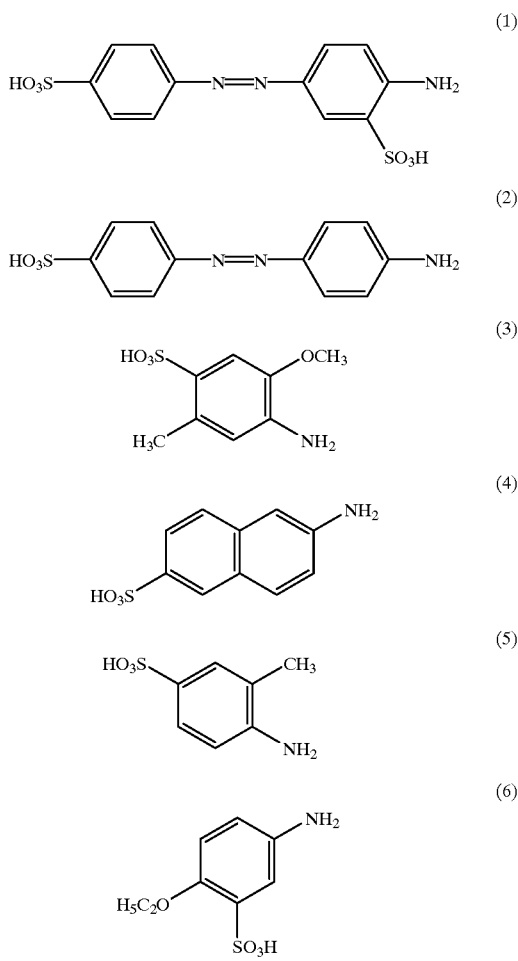

The diazotization is in general carried out by the general processes (cf.: Houben-Weyl: Methoden der anorganischen Chemie [Methods of Inorganic Chemistry] Volume X/3, year 1965, edition 4, pages 7–112 and Volume Elba, part 2, year 1990, edition 4, pages 1060–1068). The diazotization is preferably carried out by the indirect method, an aqueous solution of a nitrite salt being added to an initial mixture of an arylamine, preferably a sulphonated or carboxylated arylamine, or an alkali metal salt thereof and excess acid at 0° C. to 40° C., preferably at 10 to 25° C. The diazotization by the direct method is furthermore preferred, an aqueous mixture of an arylamine, preferably a sulphonated or carboxylated arylamine, or an alkali metal salt thereof and an inorganic nitrite salt preferably being added to an aqueous initial portion of excess inorganic acid at a temperature of 0 to 40°C., preferably 10 to 25° C.

Preferred diazotizing agents which may be mentioned are $NaNO_2$, $LiNO_2$ or nitrosylsulphuric acid. $NaNO_2$ is particularly preferred.

The solution or suspension obtained after the diazotization is in general employed for coupling to I-acid-urea as described below. The two fold coupling to I-acid-urea is preferably carried out by a procedure in which the ratio of diazo component to coupling component is 2:1 to 2.5:1. I-acid-urea has the general formula

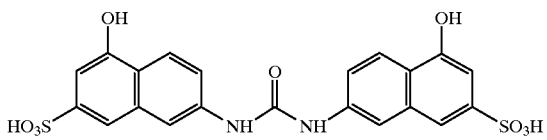

The coupling is in general carried out under known conditions, such as are known, for example, from DE-A 21 03 756, DE-A-2 103 757 and U.S. Pat. No. 2,746,955.

The coupling is preferably carried out by adding the diazo component to the coupling component, the pH of the coupling in general being kept at 5–10, preferably at 6–8.5, with the addition of an inorganic base.

Possible particularly preferred bases are alkali metal hydroxides, carbonates or bicarbonates or acetates. Sodium or lithium is preferred as the alkali metal.

The reaction mixture obtained when the coupling has ended is then preferably subjected to pressure permeation at a temperature of 15–55° C. An ultrafiltration membrane having a cut-off level of 1000–1500 Dalton is employed here in particular. Preferred ultrafiltration membranes are those of polysulphones. The pressure permeation is preferably carried out under 10–50 bar, in particular 20–40 bar. The pressure permeation is carried out down to a salt content of less than 1%, the salt content preferably being determined as the chloride content. During the pressure permeation, the mixture is subjected to diafiltration and, if appropriate, the diafiltration preceding or following a possible concentration.

The liquid dyestuff preparations prepared according to the invention preferably comprise no hydrotropic agents. Hydrotropic agents are to be understood as meaning solubility-improving additives. The following may be mentioned as examples of hydrotropic agents: low molecular weight amides, lactones, alcohols, glycols or polyols, low molecular weight ethers or oxyalkylation products and nitriles or esters. Hydrotropic agents are understood as meaning, in particular: methanol, ethanol, propanol, ethylene glycol, propylene glycol, diethylene glycol, thiodiethylene glycol and dipropylene glycol as well as triethylene glycol; butanediol; and β-hydroxypropionitrile, pentamethylene glycol, ethylene glycol monoethyl and -propyl ether, ethylene diglycol monoethyl ether, triethylene glycol monobutyl ether, butyl polyglycol, formamide, dimethylformamide, pyrrolidone, N-methylpyrrolidone, glycol acetate, butyrolactone, urea and ε-caprolactam. They particularly preferably comprise, as essential constituents, only the dyestuff in the form of its alkali metal (or ammonium) salts and water. The dyestuff is preferably present as an alkali metal salt, in particular Na, Li or K salt, in particular the Na salt. The dyestuff preparations can also additionally comprise additives, such as, for example, diethanolamine. The liquid dyestuff preparation preferably has a pH of 6 to 8, which is established with alkali if necessary. The liquid dyestuff preparation obtained by the process according to the invention preferably comprises the dyestuff in an amount of 5 to 20% by weight, preferably 8 to 13% by weight, in the form of its alkali metal salt. Even at high dyestuff concentrations, no hydrotropic agents are necessary to obtain storage-stable preparations. The dyestuff preparations obtained by the process according to the invention are distinguished by a particularly high purity and a very good storage stability.

Low-salt aqueous dyestuff preparations obtained by the process according to the invention which have an inorganic salt content of less than 1% by weight and a content of hydrotropic agents of less than 10% by weight, in particular less than 5% by weight, in each case based on the total amount of the preparation, and comprise a dyestuff which, in the form of its free acid, corresponds to the formula (II)

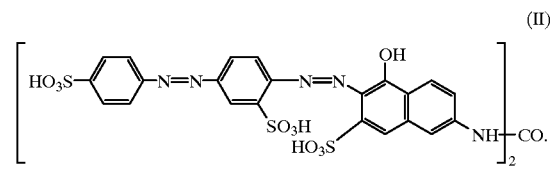

are also preferred.

The aqueous dyestuff preparation comprising the dyestuff of the formula (II) preferably comprises no hydrotropic agents. The dyestuff of the formula (II) is preferably in the form of its alkali metal salt.

The invention furthermore relates to low-salt aqueous dyestuff preparations with an inorganic salt content of less than 1% by weight and a content of hydrotropic agents of less than 10% by weight, in particular less than 5% by weight, in each case based on the total amount of the preparation, comprising a dyestuff which, in the form of its free acid, corresponds to the formula (II).

The invention furthermore relates to low-salt aqueous dyestuff preparations with an inorganic salt content of less than 1% by weight, based on the total amount of the preparation, comprising at least one dyestuff which, in the form of a free acid, corresponds to the formula (I)

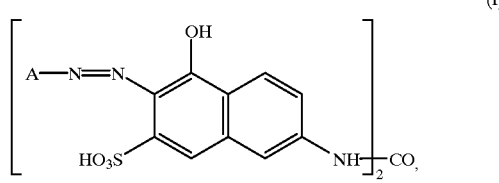

wherein

A denotes a radical of the formula

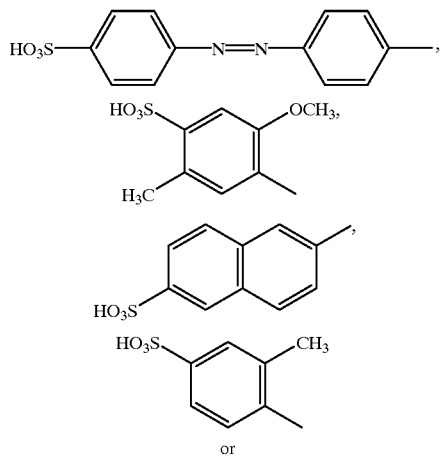

or

-continued

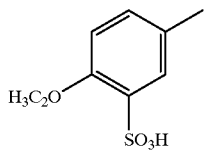

Particularly preferred aqueous dyestuff preparations according to the invention comprise a dyestuff of the formula (I) wherein
A denotes a radical of the formula

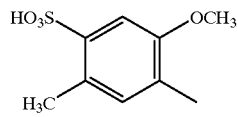

The liquid dyestuff preparation according to the invention comprising at least one dyestuff of the formula (I) preferably comprises no hydrotropic agents. It can likewise be prepared by the process according to the invention. The dyestuff is preferably present in the form of its alkali metal salt.

The statements made for the preparations prepared according to the invention furthermore apply to the dyestuff preparations according to the invention comprising a dyestuff of the formula (I).

The invention furthermore relates to a process for dyeing or printing substrates containing hydroxyl and/or amide groups using the liquid dyestuff preparations prepared by the process according to the invention or using the liquid dyestuff preparation according to the invention comprising the dyestuff of the formula (I). Substrates containing hydroxyl and/or amide groups are to be understood as meaning, in particular, paper, cotton and viscose, as well as leather.

The liquid dyestuff preparations can be used by all the processes customary for substantive dyestuffs in the paper and textile industry, in particular in pulp and surface dyeing of paper for sized or non-sized grades, starting from bleached or unbleached cellulose of varying origin, such as softwood or hardwood sulphite and/or sulphate cellulose. They can also be used in dyeing yarn and piece goods of cotton, viscose and linen by the exhaust process from a long liquor or in the continuous process.

EXAMPLES

Example 1

Process for the preparation of the dyestuff of the formula (II)

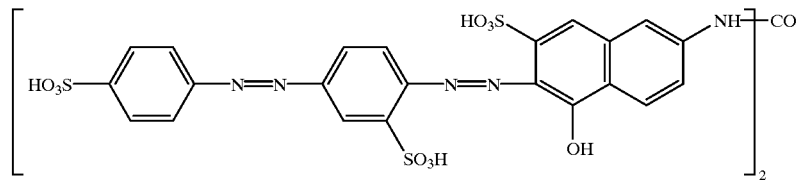

0.91 mol of 2-sulpho-4-[(1-sulphophenyl)azo]aniline (di-yellow acid) was introduced into 1.4 l of softened water, and 1.2 mol of hydrochloric acid were added. 210 ml of sodium nitrite solution (300 g/l) were added at 10–20° C. in the course of about 30 minutes. The suspension of diazotized di-yellow acid thus obtained was subsequently stirred under an excess of nitrite at 20° C. for 1 hour. Excess nitrite was then destroyed by addition of about 0.05 mol of amidosulphonic acid.

A suspension of 0.43 mol of N,N'-bis[1-hydroxy-3-sulpho-6-naphthyl]urea (I-acid-urea) in 500 ml of softened water was added to this suspension. The entire mixture was added to an initial mixture of 0.10 mol of disodium hydrogen phosphate, 330 g of a naphthalenesulphonic acid/formaldehyde condensate and 800 ml of softened water at 30° C. in the course of 1 hour, the pH being kept at 7.5 by addition of about 800 ml of sodium carbonate solution (200 g/l).

0.09 mol of di-yellow acid was diazotized analogously to the first diazotization (volume=about 700 ml) and then added to the coupling mixture at 30° C., the pH being kept at 8.5 by addition of about 200 ml of sodium hydroxide solution (400 g/l). Yield 84% of theory, based on I-acid-urea.

For the pressure permeation, the dyestuff thus obtained was first concentrated to a total volume of about 4.5 l over a polysulphone membrane (MWCO 1,000–1,500) at 25° C. under 40 bar and then subjected to diafiltration with about 7 l of deionized water. 4,510 g of a storage-stable dyestuff solution (Cl⁻=0.08%) with a pH of 8.5 were obtained. When the dyestuff solution was used for pulp dyeing of paper, brilliant dyeings were obtained.

Example 2

Process for the preparation of a dyestuff of the formula (I)

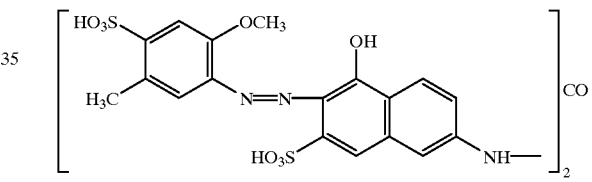

1.0 mol of 4-amino-5-methoxy-2-methylbenzenesulphonic acid (cresidicinic acid) was dissolved in 1.4 l of softened water with 1.4 mol of sodium hydroxide. 240 ml of sodium nitrite solution (300 g/l) were added to this solution. The entire mixture was added to an initial mixture of 280 ml of softened water, 2.5 mol of hydrochloric acid and 6 mmol of sodium nitrite solution in the course of 30 minutes. The suspension of diazotized cresidic acid thus obtained was subsequently stirred under an excess of nitrite at room temperature for 1 hour. Excess nitrite was then destroyed by addition of about 0.05 mol of amidosulphonic acid.

For the coupling, this suspension was added to a suspension of 0.5 mol of N,N'-bis[1-hydroxy-3-sulpho-6-naphthyl]urea (I-acid-urea) in 1.1 l of softened water at room temperature, the pH being kept at 6.0 by addition of a total of about 350 ml of sodium carbonate solution (200 g/l). Yield 97% of theory, based on the I-acid-urea.

For the pressure permeation, the dyestuff solution thus obtained was subjected to diafiltration with about 8 l of deionized water over a polysulphone membrane having a molecular weight cut-off level (MWCO level) of 1000–1500 Dalton at 50° C. under 30 bar, and was then concentrated to a total volume of about 4 l. 4,100 g of a storage-stable dyestuff solution (Cl$^-$=0.2%) with a pH of 7.0 were obtained. When this dyestuff solution was used for pulp dyeing of paper, brilliant dyeings were obtained.

We claim:

1. Low-salt aqueous dyestuff solution comprising a dyestuff content of 5 to 20% by weight, an inorganic salt content of less than 1% by weight and a content of hydrotropic agents of less than 10% by weight, in each case based on the total amount of the preparation, comprising a dyestuff which, in the form of its free acid, corresponds to the formula (II)

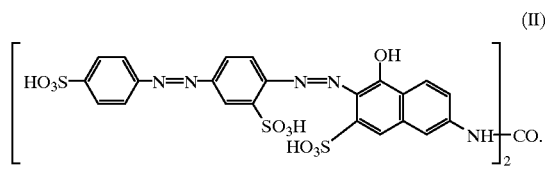

* * * * *